(12) United States Patent
Qiu et al.

(10) Patent No.: US 9,847,903 B2
(45) Date of Patent: Dec. 19, 2017

(54) METHOD AND APPARATUS FOR CONFIGURING A COMMUNICATION SYSTEM

(71) Applicant: Telefonaktiebolaget L M Ericsson (publ), Stockholm (SE)

(72) Inventors: Kermit Qiu, Guangdong (CN); Cedar Chen, Guangdong (CN); Thorsten Herber, Stockholm (SE); Johan Svedberg, Stockholm (SE)

(73) Assignee: TELEFONAKTIEBOLAGET LM ERICSSON (publ), Stockholm (SE)

( * ) Notice: Subject to any disclaimer, the term of this patent is extended or adjusted under 35 U.S.C. 154(b) by 176 days.

(21) Appl. No.: 14/435,875

(22) PCT Filed: Dec. 29, 2014

(86) PCT No.: PCT/CN2014/095280
§ 371 (c)(1),
(2) Date: Apr. 15, 2015

(87) PCT Pub. No.: WO2016/106486
PCT Pub. Date: Jul. 7, 2016

(65) Prior Publication Data
US 2016/0352559 A1   Dec. 1, 2016

(51) Int. Cl.
*H04L 12/24*   (2006.01)
*H04L 12/741*   (2013.01)

(52) U.S. Cl.
CPC ........ *H04L 41/044* (2013.01); *H04L 41/0893* (2013.01); *H04L 45/745* (2013.01)

(58) Field of Classification Search
CPC ............... H04L 41/044; H04L 41/0806; H04L 41/0893; H04L 45/745; H04L 43/50

(Continued)

(56) References Cited

U.S. PATENT DOCUMENTS

| 7,739,541 B1 * | 6/2010 | Rao .................... G06F 11/0709 709/205 |
| 7,761,538 B2 * | 7/2010 | Lin ........................ G06F 9/5061 709/220 |

(Continued)

FOREIGN PATENT DOCUMENTS

| CN | 101512507 A | 8/2009 |
| CN | 102970376 A | 3/2013 |

(Continued)

OTHER PUBLICATIONS

International Search Report and Written Opinion dated Oct. 9, 2015 in PCT application No. PCT/CN2014/095280, 12 pages.

(Continued)

*Primary Examiner* — Afsar M Qureshi
(74) *Attorney, Agent, or Firm* — Rothwell, Figg, Ernst & Manbeck, P.C.

(57) ABSTRACT

A method in a configuration server for configuring a communication system comprises configuring a plurality of nodes in a first cluster, and configuring a plurality of nodes in at least a second cluster, such that the configuration server acts as a common configuration server for at least first and second clusters. A method in a node associated with a cluster comprises determining a configuration service address relating to a common configuration server that is adapted to configure the cluster associated with the node and at least one other cluster, sending a request for configuration information to the common configuration server, and receiving configuration information from the common configuration server.

24 Claims, 8 Drawing Sheets

(58) Field of Classification Search
USPC .................................................. 370/254, 236
See application file for complete search history.

(56) References Cited

U.S. PATENT DOCUMENTS

| | | | |
|---|---|---|---|
| 8,825,789 B2* | 9/2014 | Muntz | H04L 67/1097 709/213 |
| 8,874,705 B1* | 10/2014 | Satish | G06F 13/00 709/220 |
| 2003/0074436 A1 | 4/2003 | Gieseke | |
| 2004/0249904 A1 | 12/2004 | Moore et al. | |
| 2006/0037016 A1* | 2/2006 | Saha | G06F 8/61 717/178 |
| 2011/0188378 A1* | 8/2011 | Collins | H04L 41/042 370/236 |
| 2014/0047227 A1* | 2/2014 | Breternitz | G06F 9/5066 713/2 |

FOREIGN PATENT DOCUMENTS

| | | |
|---|---|---|
| CN | 103731825 A | 4/2014 |
| WO | 2008110202 A1 | 9/2008 |

OTHER PUBLICATIONS

Extended European Search Report issued in Application No. 14909299.1 dated Oct. 26, 2017, 7 pages.

* cited by examiner

Figure 5

| | 1.1 | 1.2 | 2.1 | 2.2 |
|---|---|---|---|---|
| Configured on lowest level clusters | | | | |
| Configured on cluster 1 and 2 respectively | p5: e, p4: d | p5: e, p4: d | p6, p5: i, p4: h | p6, p5: i, p4: h |
| Configured on cluster 0 | p3: c, p2: b, p1: a | p3: c, p2: b, p1: a | p3: c, p2: b, p1: a | p3: c, p2: b, p1: a |
| Configuration ID | 1.1 | 1.2 | 2.1 | 2.2 |

METHOD AND APPARATUS FOR CONFIGURING A COMMUNICATION SYSTEM

CROSS-REFERENCE TO RELATED APPLICATION

This application is a 35 U.S.C. §371 National Phase Entry Application from PCT/CN2014/095280, filed Dec. 29, 2014, and designating the United States.

TECHNICAL FIELD

The present invention relates to a method and apparatus for configuring a communication system, for example relating to large system configuration.

BACKGROUND

The configuration of a communication system which comprises a plurality of nodes and servers, and in particular nodes and servers which are organised into clusters, is a complex task. For example, the updating of a service oriented behaviour usually requires some parameters to be configured in each node of the communication system. This not only causes long maintenance windows for such updates, but is also prone to error.

Furthermore, in existing communication systems the application nodes and configuration servers are usually tightly coupled or closely related, which means that it is difficult to support dynamic scaling-out for business needs. It is difficult to make a configuration change on all nodes of a cluster, or on all clusters in a system. It is also difficult to ensure configuration consistency between various nodes of a cluster, or between multiple clusters.

SUMMARY

It is an aim of the present invention to provide a method and apparatus which obviate or reduce at least one or more of the disadvantages mentioned above.

According to a first aspect of the present invention there is provided a method in a configuration server for configuring a communication system. The method comprises configuring a plurality of nodes in a first cluster, and configuring a plurality of nodes in at least a second cluster, such that the configuration server acts as a common configuration server for at least first and second clusters.

According to another aspect of the present invention there is provided a configuration server for configuring a communication system. The configuration server comprises a processing module adapted to configure a plurality of nodes in a first cluster, and configure a plurality of nodes in at least a second cluster, such that the configuration server acts as a common configuration server for at least first and second clusters.

According to another aspect of the present invention there is provided a method in a node of a communication system, wherein the node is associated with a cluster comprising a plurality of nodes. The method comprises determining a configuration service address relating to a common configuration server that is adapted to configure the cluster associated with the node and at least one other cluster. The method comprises sending a request for configuration information to the common configuration server, and receiving configuration information from the common configuration server.

According to another aspect of the present invention, there is provided a computer program, comprising instructions which, when executed on at least one processor, causes the at least one processor to carry out the method according to any one of the appended claims.

According to another aspect of the present invention, there is provided a carrier comprising the computer program as described above, wherein the carrier is one of an electronic signal, optical signal, radio signal or computer readable storage medium.

BRIEF DESCRIPTION OF THE DRAWINGS

For a better understanding of examples of the present invention, and to show more clearly how the examples may be carried into effect, reference will now be made, by way of example only, to the following drawings in which:

FIG. 5 provides further detail of how clusters of a communication system may be grouped in a hierarchical structure;

DETAILED DESCRIPTION

Figure 1:
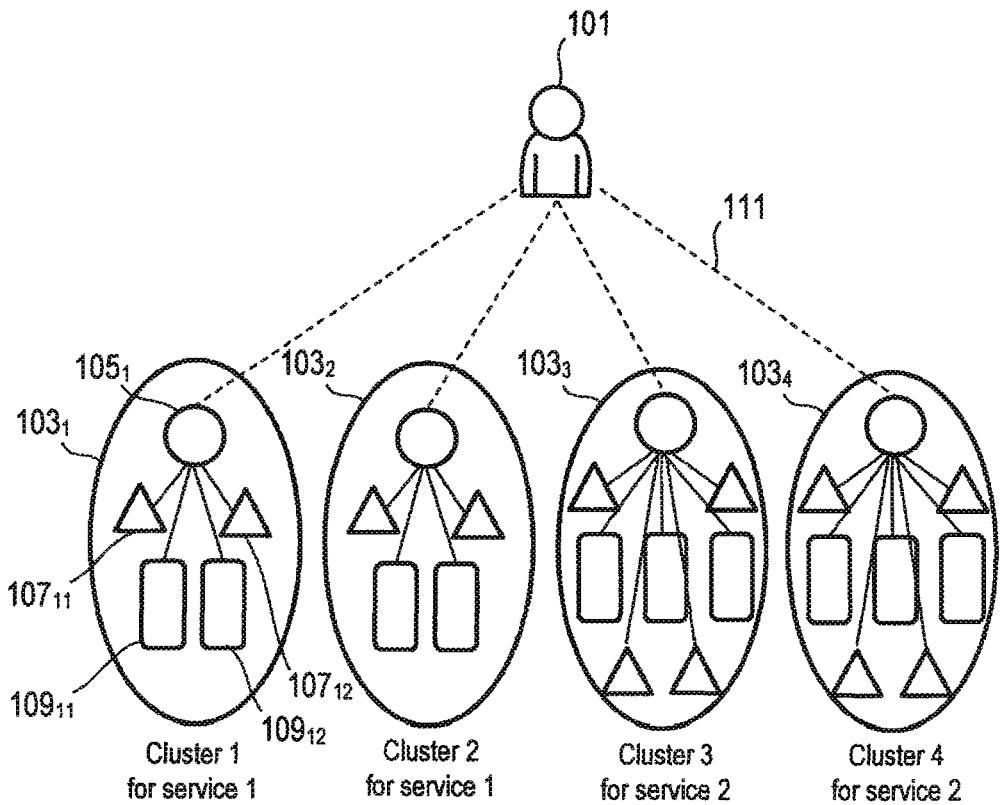
FIG. 1 shows an example of a communication system.

A cluster system normally contains many servers (or nodes). The servers may be of the same type, or of different types. As an example, a cluster system could contain 2 Load Balancing Servers (LBSs), 40 Traffic Processing Servers (TPSs), and 1 Configuration Server (CS). The configuration server manages the configuration of each server in its cluster separately. For example, each load balancing server or traffic processing server can have its own configuration in the configuration server, although most of the configurations are the same across all load balancing servers and most of the configurations are the same across all traffic processing servers. The reason is two-fold. Different types of server require different sets of configuration parameters, and each server typically has its own distinct values for some specific configuration parameters, for example, the IP address that a service should start on.

In order to simplify the description herein, a configuration that is intended to have the same value across servers or nodes will be referred to as a "common configuration", and a configuration that is intended to have a distinct value for different servers or nodes will be referred to as a "specific configuration".

In a scenario where a common configuration is to be changed, a system administrator needs to repeat the same change on every server or node. Although the tedious can be reduced by batch processing, there is still a concern over the consistency of the common configuration across all servers, since every operation has the possibility of failure.

In a scenario where the capacity of a cluster is to be expanded by adding a new traffic processing server, the operator needs to generate the new configuration for the traffic processing server by copying the configuration of an existing traffic processing server, and carrying out changes for the specific configuration of the new traffic processing server.

In a scenario where a new service is to be added, an operator needs to add or change some configuration specifically on one type of server, and add or change some configuration specifically on another type of server. For example, in order to support traffic processing for TCP port 8080, the operator needs to add "8080" to a configuration parameter of all load balancing servers, and also add "8080" to another configuration parameter of all traffic processing servers.

Large telecom operators normally have multiple same-purpose cluster systems, which can be seen as one system with multiple clusters. Each cluster has its own configuration server, with its own copy of a configuration. While a small portion of a configuration will be specific for each cluster (e.g. due to local province regulation), most of the configurations will be the same across all clusters.

In a scenario where a configuration parameter that is intended to have an equal value across all clusters is to be changed, the operator needs to repeat the same change on every cluster. Although the tedious can be reduced by batch processing, there is still a concern over the consistency of the common configuration across all clusters, since every operation has the possibility of failure.

In a scenario where a new cluster is to be added to the system, typically an operator will need to deploy a new configuration server, login to a running configuration server of an existing cluster, and copy all of that configuration to the configuration of the new cluster; and make slight changes to reflect some specific requirements of the new cluster. After the configuration server of the new cluster is populated with a proper configuration, only then can the servers that process traffic or tasks (e.g. load balancing servers and traffic processing servers) be started. In this process, many human interventions are required, for example when deploying a configuration server, accessing another configuration server, copying an existing configuration, making specific configuration changes, all of which are inefficient and also error prone.

To help explain an example of a typical configuration, FIG. 1 shows a configuration of a system in which an operator has four clusters $103_1$ to $103_4$. In the example each cluster 103 is shown as comprising a plurality of nodes of a first type 107 and a plurality of nodes of a second type 109, and a configuration server 105 for managing the configuration of each node within the cluster. It is noted that a cluster may contain further nodes, including further nodes of other types, but for ease of reference only first and second node types 107, 109 are shown. The dotted lines 111 represent manual configuration of the configuration servers 105, for example by a system administrator 101. The solid lines between the configuration servers 105 and their respective nodes 107, 109 represent, for example, private communication via a cluster-internal network, which is not directly accessible from outside.

In an example, a first cluster $103_1$ and second cluster $103_2$ may be provided for a particular service, e.g. Web Optimization, while a third cluster $103_3$ and a fourth cluster $103_4$ may be provided for another service, e.g. Video Optimization. The configuration of each node 107, 109 in each cluster 103 is distinct, for example due to each configuration containing a local configuration, such as an IP address to start the respective Web Optimization or Video Optimization services. The configuration between each node 107, 109 is difficult to synchronize. In a scenario where a common configuration for all clusters 103 needs to be updated, the system administrator 101 has to log into the configuration cluster 105 of each cluster 103 one by one to repeatedly make the same change. This is not only a tedious action but also error prone.

As can be seen from the above, existing configuration solutions expose the technical complexity to operators. As a business service is typically provided by multiple nodes of different types in a cluster system, an operator usually needs to set the different parameters in each type of node while following a strict procedure.

As another example, seven different nodes need to be updated in order to add a new service to the third cluster $103_3$ in FIG. 1. This is unnecessarily complex and also error prone.

As mentioned earlier, each node 107, 109 has a copy of the common configuration. Thus, for a cluster with n nodes, the administrator has to maintain n copies of the common configuration. For a multiple-cluster system with m clusters, the administrator has to maintain m*n copies of the common configuration. This existence of multiple copies of the common configuration has several drawbacks. For example, it is difficult to make changes on common configurations. It is also difficult to ensure the consistency of the common configurations in different nodes. Memory space is also wasted, due to the need to store a copy of the common configuration of each node.

There are also drawbacks when adding a new node to such a system, since this means a new copy of the configuration and some customization must be prepared. Adding a new cluster means that configuration and customization for all nodes in the new cluster must be prepared. The data preparation involves many manual steps, which again is prone to error.

The embodiments described below propose new concepts for organizing and managing system configuration.

According to a first aspect of the invention, the configurations of clusters in a multiple cluster system are managed by one configuration server. The configurations of these clusters are managed in a hierarchical way, where the lower level clusters can inherit configurations from higher level clusters, further details of which will be described later in the application.

According to a second aspect of the present invention, a new representation of a node specific configuration is provided, whereby a node specific configuration is elevated to be a common configuration of a cluster. This representation approach supports a node level configuration localization (or translation) from the common configuration, further details of which will also be described later in the application.

Figure 2:
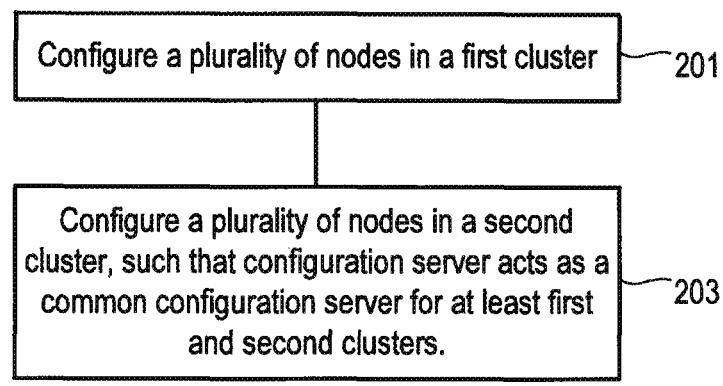
FIG. 2 shows an example of a method according to an embodiment of the present invention.

FIG. 2 shows a method in a configuration server for configuring a communication system, according to a first embodiment of the present invention. The method comprises configuring a plurality of nodes in a first cluster (step 201). The method in the configuration server further comprises the step of configuring a plurality of nodes in at least a second cluster (step 203), such that the configuration server acts as a common configuration server for at least first and second clusters.

By providing a common configuration server which is able to configure nodes in at least first and second separate clusters, this has the benefit of removing the need to have a configuration server in each cluster. Also, this allows the system to be scaled more easily.

In one example, the method comprises configuring a plurality of clusters, comprising at least the first cluster and the second cluster, in a hierarchical structure.

An advantage of the hierarchical structure of clusters is that only one configuration server is required to support multiple clusters, which provides efficiency on resource usage. Such a hierarchical structure also makes it easier to make a common configuration change, for example whereby a one time change can take effect on all lineal-descendant clusters.

The hierarchical structure of clusters also provides flexibility to introduce a new variant of cluster. For example, the new variant can be placed in a proper hierarchy, with the specific configuration parameters of the cluster then being set. All the other configurations may use inherited values.

The hierarchical structure also helps ensure configuration consistency by its nature, as the configurations that are intended to be common only have one copy.

Figure 3:
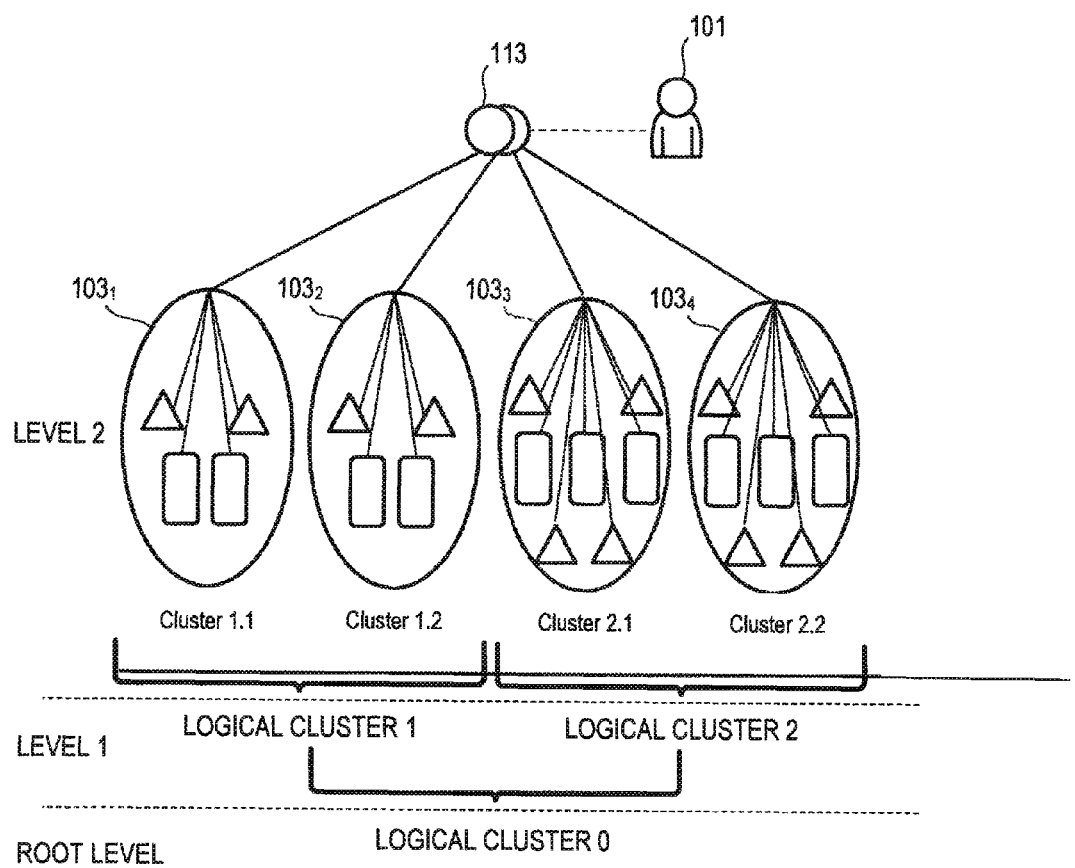
FIG. 3 shows an example of a communication system according to an embodiment of the present invention.

FIG. 3 illustrates an example of a hierarchical structure in a system in which an operator has four real clusters $103_1$ to $103_4$, (which for example have nodes taking traffic). First and second clusters $103_1$ and $103_2$ are for a service, e.g. Web Optimization, while third and fourth clusters $103_3$ and $103_4$ are for another service, e.g. Video Optimization.

Rather than having separate configuration servers $105_1$ to $105_4$ for each of the respective clusters $103_1$ to $103_4$ as with FIG. 1, the embodiment of FIG. 3 shows a common configuration server 113. The common configuration server 113 may be controlled or administered, for example, by a system administrator 101.

The four real clusters $103_1$ to $103_4$ are grouped in this example into two logical clusters: Cluster 1 for service 1 (relating to real clusters $103_1$ and $103_2$, which will also be referred to herein as Cluster 1.1 and Cluster 1.2 respectively) and Cluster 2 for service 2 (relating to real clusters $103_3$ and $103_4$, which will also be referred to herein as Cluster 2.1 and Cluster 2.2 respectively). The clusters may be grouped logically, for example, based on configuration parameters they have in common in view of their common service. Other methods may also be used to logically group clusters. The two logical clusters, i.e. Cluster 1 and Cluster 2, are further grouped to one logical cluster, the root cluster, Cluster 0. It is noted that further layers and further clusters may be provided in a hierarchical structure, but the example of FIG. 3 has been simplified for ease of reference.

Figure 4:
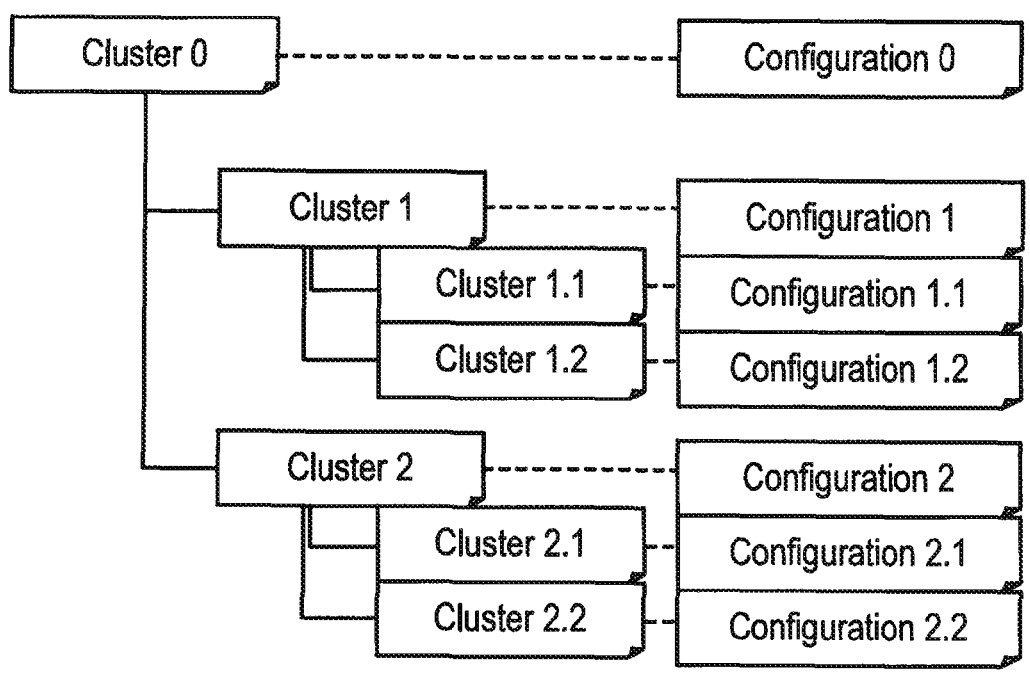
FIG. 4 illustrates an example of how clusters of a communication system may be grouped in a hierarchical structure.

FIG. 4 shows another representation of the hierarchical structure of the clusters illustrated in the example of FIG. 3.

Cluster 0, at root level, comprises a root configuration, Configuration 0;

Cluster 1, at a first hierarchical level below root level, comprises a first level configuration, Configuration 1;

Cluster 1.1, at a second hierarchical level below root level, comprises a second level configuration, Configuration 1.1;

Cluster 1.2, at a second hierarchical level below root level, comprises a second level configuration, Configuration 1.2;

Cluster 2, at a first hierarchical level below root level, comprises a first level configuration, Configuration 2;

Cluster 2.1, at a second hierarchical level below root level, comprises a second level configuration, Configuration 2.1;

Cluster 2.2, at a second hierarchical level below root level, comprises a second level configuration, Configuration 2.2;

Thus, in this example:
Cluster 0 is the parent of Cluster 1 and Cluster 2.
Cluster 1 is the parent of Cluster 1.1 and Cluster 1.2.
Cluster 2 is the parent of Cluster 2.1 and Cluster 2.2.

For the configurations relating to each cluster, FIG. 5 provides an example of how the configuration parameters may interrelate.

Configuration parameters that are intended to be common for all clusters are configured on the root cluster, Cluster 0 (this being the highest level in the hierarchical structure). In the example above, configuration parameters p1, p2 and p3 are shown as being common to all clusters (and shown as comprising values "a", "b" and "c", respectively).

Configuration parameters that are intended to be common between Cluster 1.1 and Cluster 1.2 are configured on Cluster 1 (this being at a first level in the hierarchical structure). In the example of FIG. 5, configuration parameters p4 and p5 are shown as being common to clusters at this level, i.e. common to Cluster 1.1 and Cluster 1.2 (and shown as comprising values "d" and "e", respectively).

Similarly, configuration parameters that are common between Cluster 2.1 and Cluster 2.2 are configured on Cluster 2 (this being at a first level in the hierarchical structure). In the example of FIG. 5, configuration parameters p4 and p5 are shown as being common to clusters at this level, i.e. common to Cluster 2.1 and Cluster 2.2 (and shown as comprising values "h" and "i", respectively).

Configuration parameter(s) that are intended to be specific for a cluster are configured on the lowest level clusters, in the example of FIG. 5 the lowest level being the second level below root level, and comprising Cluster 1.1, Cluster 1.2, Cluster 2.1 and Cluster 2.2. In the example, configuration parameter p6 is shown as being specific to each cluster (and shown as comprising values "f", "g", "j" and "k", respectively, for each cluster).

From the above it can be seen that reference "p" represents a particular configuration parameter, e.g. IP address to start an application, and that a value, e.g. "f", is the value of that configuration parameter, for example the IP start address specific for Cluster 1.1. Likewise, for the configuration parameter "p4", for example, both clusters 1.1 and 1.2 share the same value for this configuration parameter, i.e. "d".

Examples of configuration parameters that might be shared between clusters include, for example:
  timeout values for different communication protocols, e.g. TCP connection timeout, HTTP request timeout, etc.;
  enabled features, e.g. header enrichment enabled, content compression enabled, etc.;
  IP addresses of external nodes, e.g. black-listed IP addresses, IP address of billing system, etc.

FIG. 5 therefore shows the actual configuration of each cluster, Cluster 1.1, Cluster 1.2, Cluster 1.3 and Cluster 1.4 after combining its own specific configuration parameter(s) with inherited configuration parameters.

For example, Cluster 1.1 comprises configuration parameter p6 (having value "f" which is specific to Cluster 1.1), configuration parameters p4 and p5 (having values "d" and "e" respectively) which have been inherited from parent Cluster 1 at a higher hierarchical level, and configuration parameters p1, p2 and p3 (having values "a", "b" and "c" respectively) which have been inherited from grandparent Cluster 0, or the root cluster.

From the above it can be seen that a method according to an embodiment of the present invention comprises configuring a plurality of clusters in a hierarchical structure by grouping one or more clusters into logical groups of clusters.

Clusters in a logical group of clusters comprise at least one configuration parameter in common.

In one embodiment, the common configuration server is provided at a root level in the hierarchical structure, and wherein the root level comprises a configuration (e.g. Configuration 0) comprising one or more configuration parameters which are common to all clusters being configured by the common configuration server.

In one example, clusters in a logical group of clusters at a first level below the root level (e.g. Cluster 1; Cluster 2) share one or more configuration parameters common to that logical group of clusters, and inherit one or more configuration parameters from the root level.

In one example, the hierarchical structure comprises a plurality of levels, wherein clusters in a logical group of clusters at an intermediate hierarchical level share one or more configuration parameters common to that logical group of clusters, and inherit one or more configuration parameters from a parent hierarchical level.

The one or more configuration parameters common to a logical group of clusters at the intermediate hierarchical level may be passed down to one or more child clusters.

A cluster at a lowest hierarchical level (e.g. Clusters 1.1, 1.2, 2.1, 2.2) comprises at least one configuration parameter specific to that cluster, and inherits one or more configuration parameters from a parent cluster, and any grandparent clusters or any higher clusters in the hierarchy. It is noted that the lowest level cluster, e.g. Cluster 1.1, may have more than just one configuration parameter which is specific to that cluster.

According to one embodiment the hierarchical structure comprises a plurality of hierarchical levels, and wherein one or more clusters at a lower hierarchical level are adapted to inherit one or more configuration parameters from one or more clusters at a higher hierarchical level. The actual configuration of a cluster may be a combination of its own configuration specific to that cluster, and the actual configuration of its parent, and whereby its own configuration takes precedence.

Figure 6:
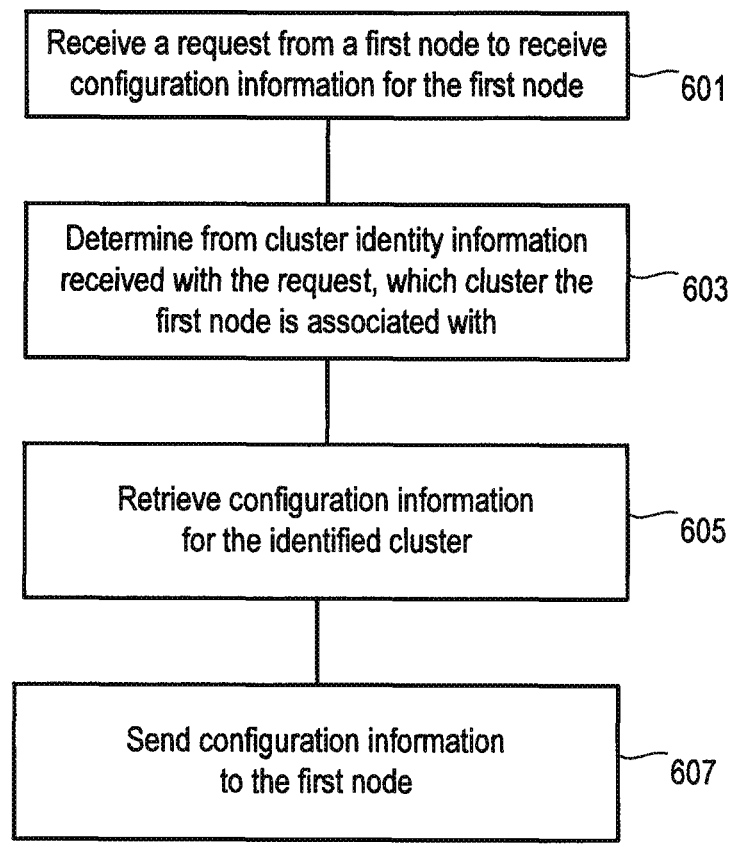
FIG. 6 shows an example of a method according to an embodiment of the present invention.

Referring to FIG. 6, a method performed in a common configuration server (such as the common configuration server 113 of FIG. 3) that is adapted to configure a plurality of clusters in this way may further comprise the steps of receiving a request from a first node to receive configuration information for the first node, step 601. The method comprises determining from cluster identity information received with the request, which cluster the first node is associated with, step 603. Configuration information is retrieved for the identified cluster, step 605, and the configuration information then sent to the first node, 607.

Figure 7:
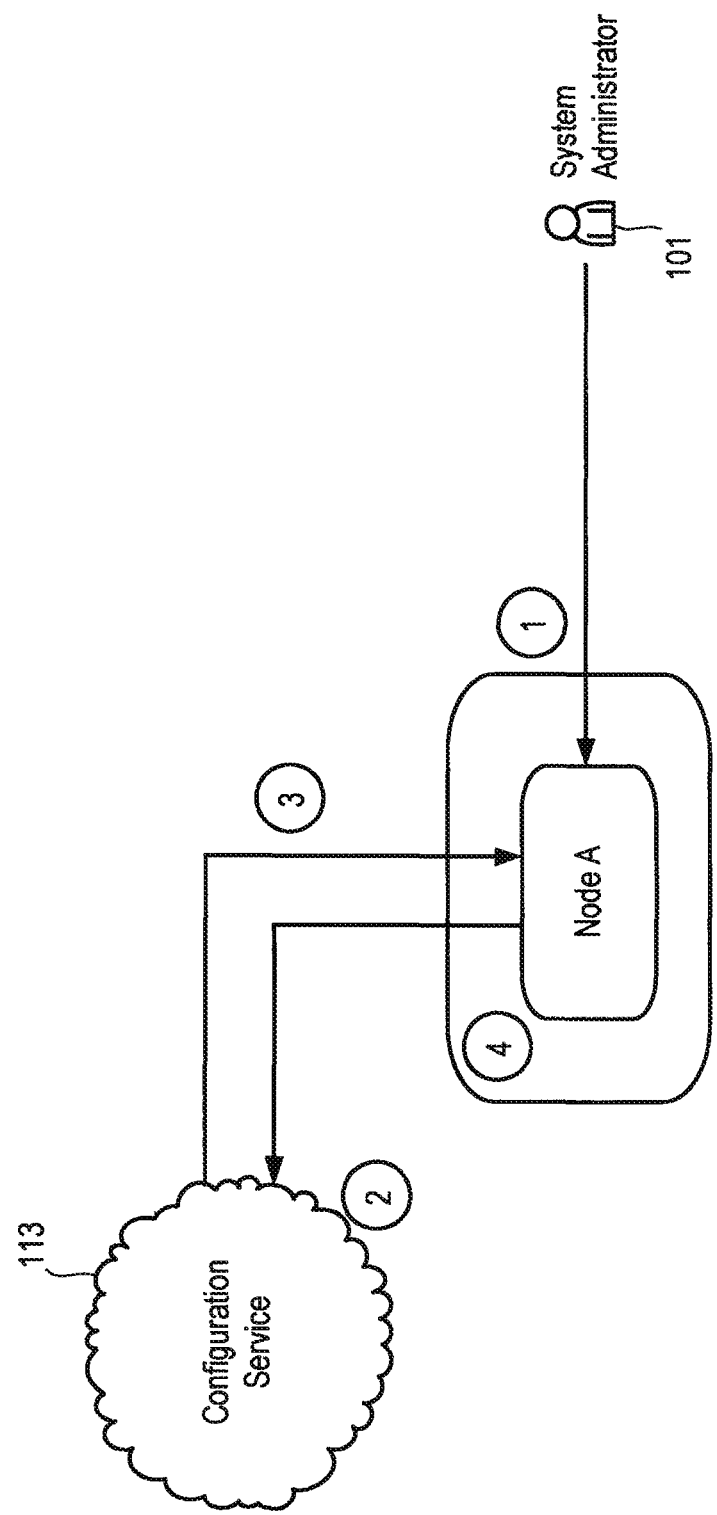
FIG. 7 illustrates an example of an application of an embodiment of the present invention.

FIG. 7 shows an example of how a node (or node instance in a cloud environment) is able to obtain configuration information from a common configuration server 113 according to an embodiment of the present invention. During a set-up or initialization procedure, for example, a new node (Node A) may be bootstrapped with information comprising a cluster identity (being the identity of the cluster the node is to be associated with) and an address of a configuration service (for example an IP address and Port associated with the common configuration server described above), as shown by step 1. Other information may also be bootstrapped to the node during a set-up or initialization procedure.

In order to obtain configuration information, in step 2 of FIG. 7, the node (Node A) sends a request for configuration information to the common configuration server 113. The address of the common configuration server is determined, for example, from an address of the configuration service that has been obtained in a bootstrap procedure as described above. The request sent in step 2 may comprise, for example, the sending of a Hypertext Transfer Protocol, HTTP, GET request for the configuration of Node A. The interface between the configuration service and the node may comprise, for example, a RESTful interface (i.e. a Representational State Transfer architecture that complies to certain architectural constraints). The HTTP GET request comprises the cluster identity, i.e. the identity of the cluster that the new node is to be associated with.

In step 3 of FIG. 7, the configuration service (e.g. common configuration server 113) returns the configuration information for this request according to the cluster identity. The configuration information may comprise, for example, configuration files represented in JavaScript Object Notation (JSON) files.

In step 4, according to one example the configuration information downloaded from the configuration service is then modified or localized to a node level configuration, and the configuration parameters can then be applied to a local node application. Further details about the translation at local level will be described later in the application.

The configuration of multiple clusters can be managed by the configuration service, i.e. a common configuration server 113. The clusters are organized in a hierarchical way. Each cluster can have its own configuration. A configuration of a cluster is inherited by its children clusters, and a child configuration can have its own configuration value. The actual configuration of a cluster is a combination of its own configuration and the actual configuration of its parent (and any higher clusters in the hierarchy), whereby its own configuration takes precedence.

Figure 8:
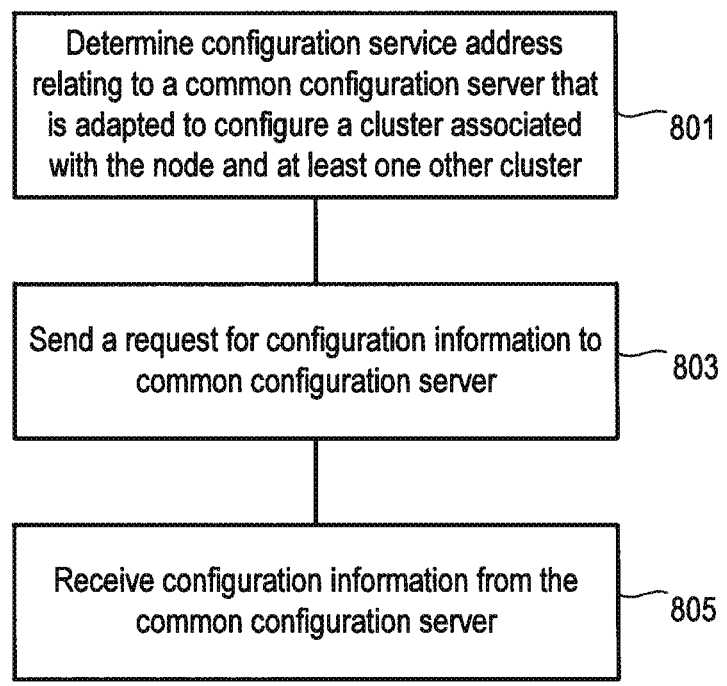
FIG. 8 shows an example of a method according to an embodiment of the present invention.

Thus, according to another embodiment of the invention as shown in FIG. 8, there is provided a method in a node of a communication system, wherein the node is associated with a cluster comprising a plurality of nodes. The method comprises determining a configuration service address relating to a common configuration server that is adapted to configure the cluster associated with the node and at least one other cluster, step 801. In step 803, a request for configuration information is sent to the common configuration server. In step 805, configuration information is received from the common configuration server.

Next, it will be described in further detail how a node can perform localization or translation of a common configuration received form a configuration server or common configuration service, into a configuration local to that node. The localization may be used in conjunction with the embodiments described herein concerning hierarchical configuration using a common configuration server, or alone in a single cluster comprising a plurality of nodes.

A large system could have thousands of nodes. Each node may need to have an unique configuration on the configuration server. This is due to the fact that the configuration usually contains some node specific configuration values, e.g. an IP address on which an application is to be started. For example, in FIG. 5 above, a node corresponding to cluster 1.1 may comprise a node specific configuration comprising configuration parameter p6 having value "f" (e.g. "f" being the starting IP address of an application at that node).

Managing thousands of unique configurations involves complexity on changing a common configuration on all nodes, ensuring consistency of common configuration across all nodes, and adding configuration for new nodes in the cluster.

According to a second aspect of the present invention, there is provided a method to elevate a node specific configuration to become a common configuration. This has an advantage that a cluster then only needs to have one common configuration, whereby all nodes in the cluster can then use this common configuration.

Thus, according to this aspect of the invention, instead of setting a node specific value for a configuration parameter, the embodiment proposes to set an alias configuration parameter as the value. Each node can be adapted to perform a localization procedure to translate the alias configuration parameter to its real node specific value, i.e. the specific configuration parameter for the node.

For example, an alias configuration parameter can follow a pattern such as:

<Separator>Tag<Separator>Attribute<Separator>
   Object<Separator>

The "<Separator>Tag" may be used to inform the node that a localization or translation procedure is to be performed. In the translation procedure, the above text is translated to the value of Attribute of Object.

For example, instead of setting a value of a specific configuration parameter of the node to an IP address, for example "1.2.3.4", the specific configuration parameter may be set instead to a value such as "#LOCALIZE#ipv4#eth1#". When the node receives this alias representation, the node performs a localization procedure to translate the alias to its first ipv4 address of interface 'eth1' (that is, "1.2.3.4"), before really applying the value to an application.

Thus, in one embodiment, upon receiving configuration information from a configuration server, such as a common configuration server, a method in a node further comprises performing a translation procedure on the received configuration information to derive a node level configuration.

Performing a translation procedure may comprise determining an alias configuration parameter in the configuration information received from the configuration server, and mapping the alias configuration parameter to a specific configuration parameter which is specific to the local node.

Mapping information may be stored at the node, for example wherein the mapping information provides a relationship between an alias configuration parameter received from a configuration server and a specific configuration parameter for the node.

Figure 9:
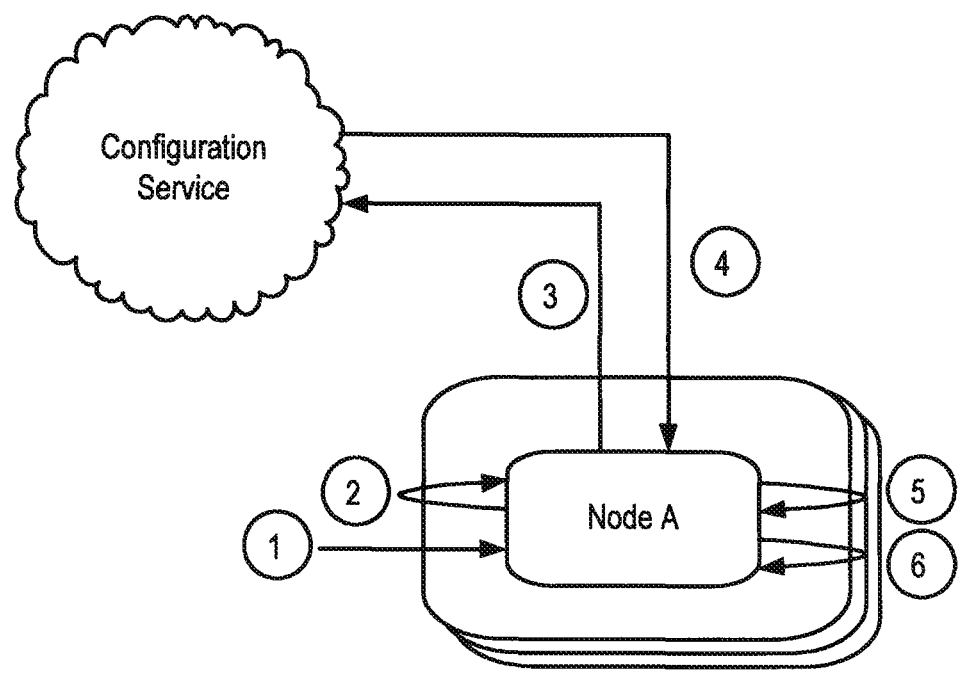
FIG. 9 illustrates another example of an application of an embodiment of the present invention.

FIG. 9 is provided as another example illustrating how the translation (localization) procedure may be provided within an overall configuring procedure.

In a first step 1, it is assumed that Node A is starting up. In step 2 the Node A performs a local IP discovery. This may involve determining a starting IP address, which identifies the IP address of the common configuration service. In step 3 the Node A sends a request for configuration information to a configuration service (such as a common configuration server), and in step 4 receives configuration information files. It step 5 the Node A translates an alias configuration parameter to a node specific value or values. In step 6, the Node A applies the configuration to an application.

In the embodiments above the system configuration may be provided as a service by a common configuration server. In one example the common configuration server is a node within a communication system, or part of another node, wherein the configuration service runs on such a node. In another example, the common configuration service is provided as a cloud based service or platform, for example a web based service. Any node that has permission to use this service can connect to this server and use the configuration service to get proper configuration.

Figure 10:
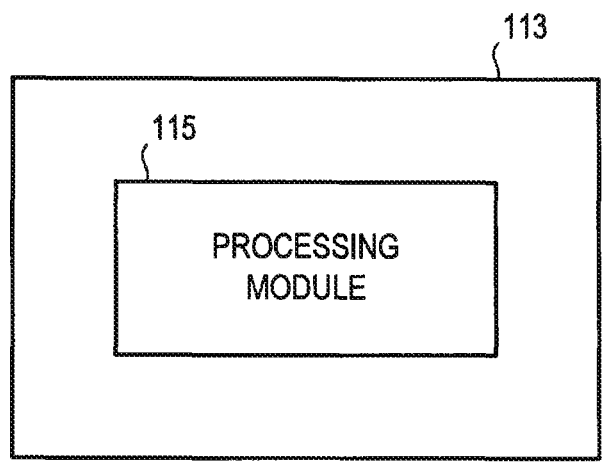
FIG. 10 shows an example of a configuration server according to an embodiment of the present invention.

FIG. 10 shows an example of a configuration server 113, according to an embodiment of the present invention, for configuring a communication system. The configuration server 113 comprising a processing module 115 adapted to configure a plurality of nodes in a first cluster, and configure a plurality of nodes in at least a second cluster, such that the configuration server 113 acts as a common configuration server for at least first and second clusters.

The processing module 115 may be adapted to perform any of the steps described herein for the common configuration server.

A node can use a protocol such as HTTP, for example, to download its configuration from such a configuration server.

In some embodiments described above, it can be seen that a node specific configuration is elevated to be a common configuration, such that a cluster can have only one copy of a configuration, which all nodes in the cluster can share.

Furthermore, in some embodiments the clusters can be organized into logical groups. The configuration of a cluster may be inherited by its children clusters. Therefore a common configuration of a set of clusters can be put to a higher level cluster, and the operator just needs to maintain only one copy of the common configuration across clusters.

The embodiments described herein remove the necessity for each cluster to have its own configuration server.

In the examples described above the configuration service and node are loosely coupled, which has an advantage in that both ends can expand or evolve with minimal impact to the other.

A node may be bootstrapped with information including cluster identity, configuration service address, and some other information. The configuration service address can be used by a node to contact the configuration service. The cluster identity enables the node to retrieve the configuration files that are available to that cluster.

The embodiments described above help reduce the complexity of configuration for large system.

The embodiments of the present invention enable the configuration management of a large system to be carried out much simpler and more efficiently. The embodiments also provide a better support to the high elasticity requirement in cloud computing environment. By high elasticity it is meant that it should be easy to adapt the number of servers in a cluster depending on the traffic profile. For example, it is advantageous not to require any extra configuration to add servers to a cluster at a busy period of traffic, or to remove servers from a cluster during low traffic.

The embodiments above have the advantage of providing simple and efficient configuration management. For example, an operator just needs to perform service oriented configuration change for a cluster. The complexity of the mapping between service oriented configuration and configurations of various types of nodes are transparent to the operator.

The hierarchical configuration architecture keeps minimized copies of a common configuration across clusters. Thus, it is comparatively easier to make a common configuration change to all clusters. The consistency of configurations across clusters is also improved due to there being only one copy of the common configuration in existence.

Since node specific configurations can be elevated to be a common configuration, all the nodes in a cluster can share the same copy of the common configuration, which has an advantage in that an operator does not need to do any configuration change when the cluster is scaling-out, i.e. becoming larger.

Also, when new clusters are added, an operator just needs to do minimized configuration changes since most of the configuration can be inherited from higher level clusters in the hierarchical architecture.

The embodiments of the invention may be platform independent, and may be used for a bare-metal machine, a virtualization environment and a Cloud environment. As will be understood by a person skilled in the art, a "bare-metal" machine is a traditional server, on which the operating system has direct access to the hardware (e.g. a Linux server, or Windows on a laptop, etc.). In a virtualization environment and a cloud environment the operating system of a virtual server runs on top of a software, which is called hypervisor. The operating system of the virtual server has no direct access to the hardware. All calls are handled via the hypervisor.

According to one embodiment there is provided a method for configuring a communication system comprising one or more clusters, each cluster comprising a plurality of associated communication nodes of one or more type, the method comprising controlling the configuration of the plurality of clusters using a common, or single, configuration server.

The plurality of clusters may be controlled in a hierarchical structure. Any configuration parameters that are common to a group of first level clusters of a first level in the hierarchy are inherited from a common cluster at second level, the second level being higher than the first level, and any parameters common to clusters at the second level are inherited from a common cluster at a third level, the third level being higher than the second level, and so on until a root level is reached where the configuration parameters of the root level are common to all clusters in the system.

It should be noted that the above-mentioned embodiments illustrate rather than limit the invention, and that those skilled in the art will be able to design many alternative embodiments without departing from the scope of the appended claims. The word "comprising" does not exclude the presence of elements or steps other than those listed in a claim, "a" or "an" does not exclude a plurality, and a single processor or other unit may fulfil the functions of several units recited in the claims. Any reference signs in the claims shall not be construed so as to limit their scope.

The invention claimed is:

1. A method in a configuration server for configuring a communication system, the method comprising:
    configuring a first plurality of nodes in a first cluster, each of the first plurality of nodes storing a configuration service address relating to the configuration server; and
    configuring a second plurality of nodes in a second cluster, each of the second plurality of nodes storing the configuration service address relating to the configuration server, such that the configuration server acts as a common configuration server for at least the first and second clusters.

2. The method as claimed in claim 1, further comprising the step of configuring a plurality of clusters, comprising at least the first cluster and the second cluster, using a hierarchical structure.

3. The method as claimed in claim 2, wherein configuring a plurality of clusters using a hierarchical structure comprises grouping one or more clusters into logical groups of clusters.

4. The method as claimed in claim 3, wherein clusters in a logical group of clusters comprise at least one configuration parameter in common.

5. The method as claimed in claim 2, wherein the common configuration server is provided at a root level in the hierarchical structure, and wherein the root level comprises a configuration comprising one or more configuration parameters which are common to all clusters being configured by the common configuration server.

6. The method as claimed in claim 5, wherein clusters in a logical group of clusters at a first level below the root level share one or more configuration parameters common to that logical group of clusters, and inherit one or more configuration parameters from the root level.

7. The method as claimed in claim 6, wherein the hierarchical structure comprises a plurality of levels, and wherein clusters in a logical group of clusters at an intermediate hierarchical level share one or more configuration parameters common to that logical group of clusters, and inherit one or more configuration parameters from a parent hierarchical level.

8. The method as claimed in claim 7, wherein the one or more configuration parameters common to a logical group of clusters at the intermediate hierarchical level are passed down to one or more child clusters.

9. The method as claimed in claim 6, wherein a cluster at a lowest hierarchical level comprises at least one configuration parameter specific to that cluster, and inherits one or more configuration parameters from a parent cluster, and any grandparent clusters and any clusters higher in the hierarchy.

10. The method as claimed in claim 6, further comprising the step of providing an alias configuration parameter in place of the at least one configuration parameter specific to a cluster, wherein the alias configuration parameter is for use by a node having the at least one specific configuration parameter, for translating the alias configuration parameter into a local configuration parameter specific to the respective node.

11. The method as claimed in claim 2, wherein the hierarchical structure comprises a plurality of hierarchical levels, and wherein one or more clusters at a lower hierarchical level are adapted to inherit one or more configuration parameters from one or more clusters at a higher hierarchical level.

12. The method as claimed in claim 2, wherein the actual configuration of a cluster is a combination of its own configuration specifc to that cluster, and the actual configuration of its parent cluster and any higher level clusters in the hierarchy, and whereby its own configuration takes precedence.

13. The method as claimed in claim 1, further comprising:
    receiving a request from a first node to receive configuration information for the first node;
    determining from cluster identity information received with the request, which cluster the first node is associated with;
    retrieving configuration information for the identified cluster; and
    sending the configuration information to the first node.

14. The method as claimed in claim 1, wherein the first cluster comprises a first plurality of nodes and the second cluster comprises a second plurality of nodes.

15. The method of claim 1, further comprising:
    the configuration server receiving a first request for configuration information, wherein said first request was transmitted by a first node;

the configuration server determining that the first node is included in said first plurality of nodes configured in said first cluster;

the configuration server, as a result of determining that the first node is included in said first plurality of nodes, obtaining configuration information for said first cluster and transmitting the configuration information for said first cluster to the first node;

the configuration server receiving a second request for configuration information, wherein said second request was transmitted by a second node;

the configuration server determining that the second node is included in said second plurality of nodes configured in said second cluster; and the configuration server, as a result of determining that the second node is included in said second plurality of nodes, obtaining configuration information for said second cluster and transmitting the configuration information for said second cluster to the second node.

16. A configuration server for configuring a communication system, the configuration server comprising a processor, the processor adapted to:

configure a plurality of nodes in a first cluster, each of the plurality of nodes in the first cluster storing a configuration service address relating to the configuration server, and configure a plurality of nodes in at least a second cluster, each of the plurality of nodes in the second cluster storing the configuration service address relating to the configurations server, such that the configuration server acts as a common configuration server for at least the first and second clusters.

17. The configuration server as claimed in claim 16, wherein the processor is further adapted to:

configure a plurality of clusters, comprising at least the first cluster and the second cluster, using a hierarchical structure.

18. A method in a node of a communication system, wherein the node is associated with a cluster comprising a plurality of nodes, the method comprising:

determining a configuration service address relating to a common configuration server that is adapted to configure the cluster associated with the node and at least one other cluster;

sending a request for configuration information to the common configuration server; and receiving configuration information from the common configuration server.

19. The method as claimed in claim 18, wherein the sending step comprises sending cluster identity information, the cluster identity information identifying the cluster which the node is associated with.

20. The method as claimed in claim 19, comprising receiving and storing the cluster identity and/or configuration service address at the node during an initial set-up procedure for the node.

21. The method as claimed in claim 18, wherein, upon receiving configuration information from the common configuration server, the method further comprises performing a translation procedure on the received configuration information to derive a node level configuration.

22. The method as claimed in claim 21, wherein performing the translation procedure comprises:

determining an alias configuration parameter in the configuration information received from the configuration server; and mapping the alias configuration parameter to a specific configuration parameter which is specific to the node.

23. The method as claimed in claim 22, further comprising storing mapping information at the node, wherein the mapping information provides a relationship between an alias configuration parameter received from a configuration server and a specific configuration parameter for the node.

24. A non-transitory computer readable medium storing a computer program comprising instructions which, when executed on at least one processor, causes the at least one processor to carry out the method according to claim 18.

* * * * *